A. H. BURNS.
WHEEL TIRE.
APPLICATION FILED DEC. 27, 1916.
1,232,490.
Patented July 10, 1917.
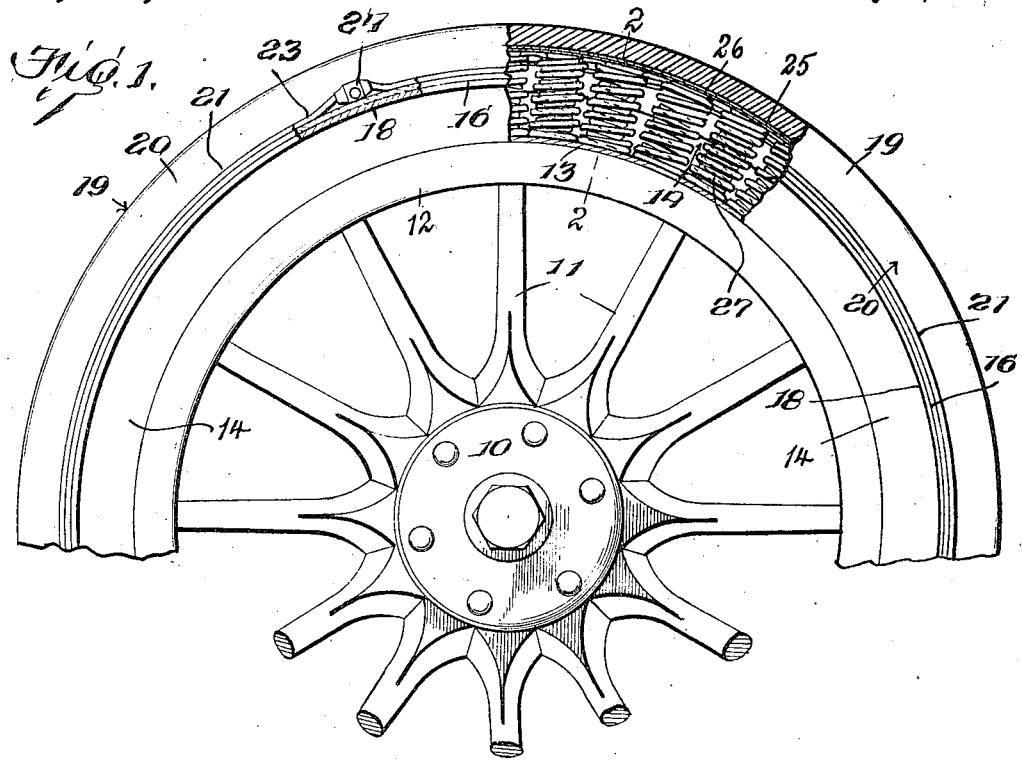
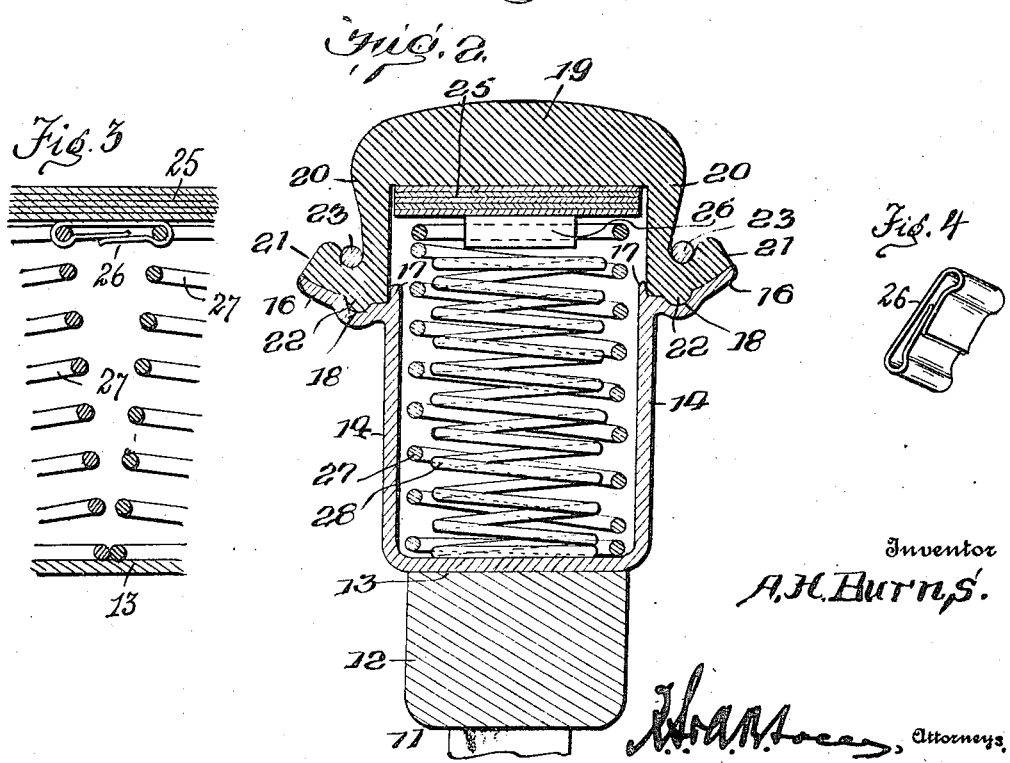
Inventor
A. H. Burns
Attorneys

UNITED STATES PATENT OFFICE.

ARTHUR H. BURNS, OF PENN YAN, NEW YORK.

WHEEL-TIRE.

1,232,490. Specification of Letters Patent. Patented July 10, 1917.

Application filed December 27, 1916. Serial No. 139,154.

*To all whom it may concern:*

Be it known that I, ARTHUR H. BURNS, a citizen of the United States, residing at Penn Yan, in the county of Yates and State of New York, have invented certain new and useful Improvements in Wheel-Tires, of which the following is a specification.

This invention relates to improvements in resilient wheel tires, more particularly applicable to automobiles and like vehicles, and has for one of its objects to improve the construction and produce a device of this character which will possess all of the advantages of a pneumatic tire without danger of impairment by punctures and the like.

Another object of the invention is to provide a device of this character including a plurality of springs spaced apart and with means for protecting the tread from frictional engagement with the springs.

Another object of the invention is to provide a device of this character wherein provision is made for preventing lateral displacement of the parts under lateral stress as when moving upon curves or around corners.

Another object of the invention is to provide a device of this character wherein the parts may be readily assembled, and broken or impaired parts renewed without discarding the remainder of the device.

With these and other objects in view, the invention consists in certain novel features of construction, as hereinafter shown and described and then specifically pointed out in the claim; and in the drawings illustrative of the preferred embodiment of the invention—

Figure 1 is a side elevation partly in section of a portion of a wheel with the improved device applied.

Fig. 2 is an enlarged transverse section on the line 2—2 of Fig. 1.

Fig. 3 is an enlarged sectional detail of portions of a pair of the springs illustrating the manner of coupling them at the outer terminals.

Fig. 4 is a detached perspective view of one of the spring coupling devices.

Corresponding and like parts are referred to in the following description and indicated in all the views of the drawings by the same reference characters.

The hub of the wheel is represented at 10, the spokes at 11, and the felly at 12. Bearing upon the outer face of the felly is an annular rim including an inner portion 13 bearing upon the felly and side portions 14 in spaced relation laterally of the wheel. At its outer edge each side portion 14 is provided with a lateral outwardly directed flange 16. The outer faces of the flanges extend obliquely to the planes of the side portions and away from the same, or in other words with the outer faces of the flanges inclined inwardly toward the center line of the wheel. At the juncture of the flanges 16 and the side portions 14 annular ribs 17 are formed which constitute stops at the inner edges of the flanges. Formed in the outer face of each flange is an annular channel 18.

The tread or wearing portion of the tire is formed with a relatively heavy outer portion 19 and inwardly directed side portions 20. At their inner edges the side portions 20 are directed outwardly in the form of flanges 21, the flanges operating to closely engage the inclined outer faces of the flanges 16, and each flange provided with an annular rib 22 to engage respectively in the annular channels 18. At their inner edges the flanges 21 bear against the stop ribs 17, as shown in Fig. 2.

Each of the flanges 21 is provided with an annular socket in its outer face to receive a binding member 23, the latter being each provided at one point with a turnbuckle device 24 whereby the members 23 may be strained around the wheel, and thus clamp the tread portion firmly in position. By this arrangement the tread portion is drawn tightly against the inclined flanges 16 and against the stop ribs 17. By locating seats for the binder members 23 to open outwardly and against the vertical portions 20 of the casing, relatively large annular projections are formed externally of the binder members 23 as clearly shown in Fig. 2, to effectually prevent the casing from being forced from position under stress. The ribs 22 are also firmly compressed into the channels 18, thereby materially increasing the grip between the parts and effectually preventing any tendency to lateral displacement under the severe strains to which devices of this character are liable when in use, when moving on sharp curves or around corners at high speed, especially when heavily loaded. The tread portion is preferably of relatively hard rubber or other suitable material or compound, while the rim member is of metal, preferably steel, pressed into the required shape. Any suitable means may be employed for supporting the rim upon the felly, but as this part of the device is not a part of the present invention it is not thought necessary to illustrate the same.

Disposed within the tread portion is a band of yieldable material, preferably leather or the like, and constructed in a plurality of layers, as represented at 25.

Disposed between the band 25 and the bottom 13 of the rim are a plurality of outer springs 27 each having an inner spring 28 therein. The springs are preferably of the coiled form and the outer springs are arranged with their inner helixes, or those in contact with the bottom 13 of the channeled rim, in close contact, which position will cause the outer helixes to be spaced caused by the curvature of the rim. The outer helixes of the springs are coupled by clip or link devices 26, one of which is represented in Fig. 4. The clip or link devices are each formed from a strip of metal, preferably steel, bent into the shape shown in Figs. 3 and 4, with the ends overlapping. The links at their bends are compressed around the wires of the terminal helixes of the adjacent springs, so that the springs are held from movement toward each other as well as away from each other.

The outer portions of the links are without projection, hence will not wear the relatively soft material of the guard device 25.

The inner springs 28 are smaller than the outer springs 27 and are also preferably shorter than the outer springs, and become active only when the tread is abnormally depressed, to reinforce the tread and prevent its collapse under abnormal stress or impact.

The rim 13—14, it will be noted, is in the form of a relatively deep channel, as shown in Fig. 2, and the springs 27—28 are located within the channeled rim and effectually prevented from lateral displacement by the relatively high side portions 14 of the rim.

The improved device may be constructed of any required size to adapt the device to wheels employed on any of the ordinary make of automobiles or auto-trucks or like vehicles.

Having thus described the invention, what is claimed as new is—

The combination of a wheel rim including laterally directed flanges having their outer faces sloping inwardly with annular stop shoulders at the inner terminals of the sloping faces, said sloping faces each having an annular channel, a tire casing including laterally directed flanges with their inner faces corresponding to and bearing against the sloping faces of the rim flanges with annular ribs engaging the rim channels, each casing flange having an outwardly opening annular seat, binding members engaging in the annular seats, and means for applying strain to said binding members to compress the sloping faces of the casing flanges against the sloping faces of the rim flanges and against the stop shoulders.

In testimony whereof I affix my signature.

ARTHUR H. BURNS. [L. S.]